US012585797B2

(12) United States Patent
Pan et al.

(10) Patent No.: US 12,585,797 B2
(45) Date of Patent: Mar. 24, 2026

(54) FEDERATED DATA QUERY METHODS AND APPARATUSES BASED ON PRIVACY PRESERVING

(71) Applicant: Alipay (Hangzhou) Information Technology Co., Ltd., Hangzhou (CN)

(72) Inventors: Wuqiong Pan, Hangzhou (CN); Tao Wei, Hangzhou (CN); Tingting Li, Hangzhou (CN); Ran Duan, Hangzhou (CN); Bei Jin, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 66 days.

(21) Appl. No.: 18/778,619

(22) Filed: Jul. 19, 2024

(65) Prior Publication Data
US 2024/0370578 A1 Nov. 7, 2024

Related U.S. Application Data

(63) Continuation of application No. PCT/CN2023/070474, filed on Jan. 4, 2023.

(30) Foreign Application Priority Data

Jan. 20, 2022 (CN) .......................... 202210068068.8

(51) Int. Cl.
G06F 21/60 (2013.01)
G06F 16/2455 (2019.01)
G06F 16/25 (2019.01)
(52) U.S. Cl.
CPC ........ G06F 21/602 (2013.01); G06F 16/2455 (2019.01); G06F 16/256 (2019.01)

(58) Field of Classification Search
None
See application file for complete search history.

(56) References Cited

U.S. PATENT DOCUMENTS

2009/0041253 A1  2/2009 Chen et al.
2016/0344707 A1  11/2016 Philipp
(Continued)

FOREIGN PATENT DOCUMENTS

CN      103049473      4/2013
CN      103345526      10/2013
(Continued)

OTHER PUBLICATIONS

Popa et al. "CryptDB: Processing Queries on an Encrypted Database." Communications of the ACM, vol. 55 Issue 9. pp. 103-111. Sep. 1, 2012 (Year: 2012).*
(Continued)

*Primary Examiner* — Jeffrey R Swearingen
(74) *Attorney, Agent, or Firm* — Fish & Richardson P.C.

(57) ABSTRACT

Data query methods, apparatuses and computer-readable media are described. In an example process of processing, by a third party, a federated data table formed based on data of a plurality of data parties, if related data need to be obtained based on sorting of multiple attribute columns of the data table, when the federated data table is sorted based on attribute values of the attribute columns, a row identifier is introduced for an out-of-order data table obtained by disordering the federated data table, and an index is created based on the row identifier. The row identifier is determined by the third party and exists in a form of ciphertext in an index table. A row identifier of a candidate row can be restored to a plaintext.

20 Claims, 3 Drawing Sheets

(56) References Cited

U.S. PATENT DOCUMENTS

| | | | |
|---|---|---|---|
| 2019/0220620 A1 | 7/2019 | Hahn et al. | |
| 2021/0350014 A1 | 11/2021 | Yeo et al. | |
| 2022/0129706 A1* | 4/2022 | Vivona | G06N 3/0475 |
| 2022/0374540 A1* | 11/2022 | Parks | G06F 16/288 |
| 2023/0129422 A1* | 4/2023 | Adir | G06F 21/602 |
| | | | 707/687 |

FOREIGN PATENT DOCUMENTS

| | | | | | |
|---|---|---|---|---|---|
| CN | 103593476 | | 2/2014 | | |
| CN | 106850187 | | 6/2017 | | |
| CN | 111597548 | | 8/2020 | | |
| CN | 111737751 | | 10/2020 | | |
| CN | 111914264 | | 11/2020 | | |
| CN | 111935141 | | 11/2020 | | |
| CN | 112860738 | | 5/2021 | | |
| CN | 113672949 | | 11/2021 | | |
| CN | 113868295 | | 12/2021 | | |
| CN | 113886887 | | 1/2022 | | |
| CN | 114090638 | | 2/2022 | | |
| CN | 114726511 | | 7/2022 | | |
| CN | 114726514 | | 7/2022 | | |
| CN | 115168409 | | 10/2022 | | |
| CN | 115239486 | | 10/2022 | | |
| CN | 115587233 | | 1/2023 | | |
| CN | 115587382 | | 1/2023 | | |
| CN | 115688167 | | 2/2023 | | |
| CN | 116166693 | | 5/2023 | | |
| CN | 111104731 | B | * | 9/2023 | G06F 9/451 |
| CN | 116886447 | | 10/2023 | | |
| CN | 117077209 | | 11/2023 | | |
| CN | 113780571 | B | * | 3/2025 | G06F 16/285 |
| CN | 113239395 | B | * | 4/2025 | H04L 63/0442 |
| EP | 3392864 | A1 | | 10/2018 | |
| WO | WO 2023/179185 | | | 9/2023 | |

OTHER PUBLICATIONS

Liu et al. "Secure and Efficient Multi-Attribute Range Queries based on Comparable Inner Product Encoding." 2018 IEEE Conference on Communications and Network Security. May 30, 2018. 9 Pages. (Year: 2018).*

Extended European Search Report in European Appln. No. 23742695. 2, mailed on Mar. 5, 2025, 8 pages.

Li et al., "Fragmentation and Encryption-Based Privacy-preserving Mechanism for Cloud Database," Journal of Information Engineering University, Jun. 2012, 13(3):376-384 (with English abstract).

International Preliminary Report on Patentability in International Appln. No. PCT/CN2023/070474, mailed on Aug. 2, 2024, 11 pages (with English translation).

International Search Report and Written Opinion in International Appln. No. PCT/CN2023/070474, mailed on Mar. 1, 2023, 13 pages (with English translation).

* cited by examiner

Divide data U into U=U1+U2+U3

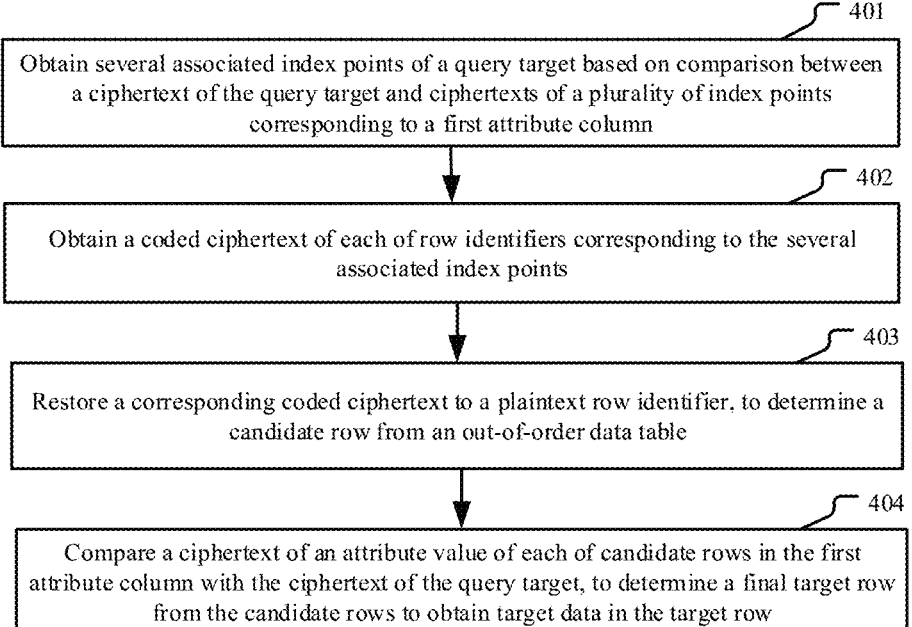

401

Obtain several associated index points of a query target based on comparison between a ciphertext of the query target and ciphertexts of a plurality of index points corresponding to a first attribute column

402

Obtain a coded ciphertext of each of row identifiers corresponding to the several associated index points

403

Restore a corresponding coded ciphertext to a plaintext row identifier, to determine a candidate row from an out-of-order data table

404

Compare a ciphertext of an attribute value of each of candidate rows in the first attribute column with the ciphertext of the query target, to determine a final target row from the candidate rows to obtain target data in the target row

FIG. 4

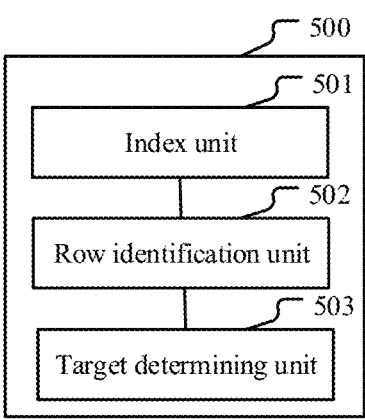

500

501

Index unit

502

Row identification unit

503

Target determining unit

FIG. 5

FEDERATED DATA QUERY METHODS AND APPARATUSES BASED ON PRIVACY PRESERVING

CROSS-REFERENCE TO RELATED APPLICATIONS

This application is a continuation of PCT Application No. PCT/CN2023/070474, filed on Jan. 4, 2023, which claims priority to Chinese Patent Application No. 202210068068.8, filed on Jan. 20, 2022, and each application is hereby incorporated by reference in its entirety.

TECHNICAL FIELD

One or more embodiments of this specification are associated with the field of computer technologies, and in particular, to federated data query methods and apparatuses based on privacy preserving.

BACKGROUND

In the big data background, service data of different data parties often need to be comprehensively processed. For example, in a scenario of analyzing user information, data party 1 holds physical condition data such as heights and weights of users, data party 2 holds salary data of the users, and data party 3 holds debit and credit data of the users. In a process of jointly processing data of a plurality of parities, preserving and security of data privacy have become a concern.

Joint data processing can be implemented through secure multi-party computation (MPC), etc. Through secure multi-party computation, related data can be jointly processed to achieve some service objectives in a case that each data party does not leak local data to another data party. Particularly, secure joint data processing can be implemented with the help of a trusted third party when data exchange between data parties is insufficient to ensure data security, device performance cannot satisfy time validity of data processing, etc. With the participation of the third party, local data provided by the data parties for the third party are usually encrypted to ensure data security. Data obtained by the third party are usually ciphertext data. If the ciphertext data need to be repeatedly used, for example, queried for use, the third party can construct a ciphertext database for the data of the data parties. In database query scenarios, especially query scenarios such as range query and ranking query, how to avoid leaking data privacy via a database index, etc. is crucial in data security.

SUMMARY

One or more embodiments of this specification describe data query methods and apparatuses based on privacy preserving, to resolve one or more problems mentioned in the background.

According to a first aspect, a federated data query method based on privacy preserving is provided, used by a third party to securely query target data from a federated data table of a plurality of data parties. The federated data table is an attribute ciphertext data table securely created based on federated attribute data of the plurality of data parties for multiple service subjects. The method is performed by the third party and includes the following: obtaining multiple associated index points of a query target based on comparison between a ciphertext of the query target and ciphertexts of a plurality of index points corresponding to a first attribute column, where each index point corresponding to the first attribute column is a data segmentation point for indexes created based on attribute value sorting of the first attribute column, and the query target includes a query value in the first attribute column; obtaining a coded ciphertext of each of row identifiers corresponding to the multiple associated index points, where a row identifier of each row is determined through row coding for an out-of-order data table pre-obtained by disordering the federated data table; restoring a corresponding coded ciphertext to a plaintext row identifier, to determine a candidate row from the out-of-order data table; and comparing a ciphertext of an attribute value of each of candidate rows in the first attribute column with the ciphertext of the query target, to determine a final target row from the candidate rows to obtain target data in the target row.

In some embodiments, the third party has a trusted cryptographic computing architecture, the trusted cryptographic computing architecture includes a plurality of nodes, and a service associated with the federated data table is processed between the nodes through secure multi-party computation.

In some further embodiments, the federated data table is stored in a form of component ciphertext in the third party, a single node stores a corresponding single component ciphertext for a single element in the federated data table, the query target is split into components by a querier, and each node holds a component ciphertext of a single component.

In some embodiments, a single node in the third party is implemented in a trusted execution environment.

In some embodiments, the obtaining multiple associated index points of a query target based on comparison between a ciphertext of the query target and ciphertexts of a plurality of index points corresponding to a first attribute column includes the following: sequentially performing size comparison between a ciphertext of the query value and the index points corresponding to the first attribute column; and when a comparison result is that the query value has opposite size relationships with two adjacent index points, determining the two adjacent index points as associated index points of the query target.

In some embodiments, the obtaining multiple associated index points of a query target based on comparison between a ciphertext of the query target and ciphertexts of a plurality of index points corresponding to a first attribute column includes the following: sequentially performing size comparison between a ciphertext of the query value and the index points corresponding to the first attribute column; and when a comparison result is that the query value is less than all index points/greater than all index points, determining a smallest index point/largest index point as an associated index point of the query target.

In some embodiments, for the first attribute column, each index point is determined in the following manner: extracting each attribute value ciphertext of the first attribute column from the out-of-order data table, to form a first index table with a coded ciphertext of a corresponding row identifier, where a coded ciphertext of a single row identifier is obtained by encrypting the single row identifier in a predetermined manner; performing sorting based on a size of an attribute value of the first attribute column after disordering the first index table; and determining each index point based on a sorting result and a predetermined attribute value segmentation condition.

In some embodiments, the plurality of index points corresponding to the first attribute column are level-1 index points of the first attribute column, a single level-1 index point corresponds to a plurality of level-2 index points, and the level-2 index points segment row data corresponding to the single level-1 index point into a plurality of level-2 index attribute value ranges; and the obtaining multiple associated index points of a query target based on comparison between a ciphertext of the query target and ciphertexts of index points corresponding to a first attribute column includes the following: comparing the ciphertext of the query target with a ciphertext of each level-1 index point of the first attribute column, to obtain multiple level-1 index points associated with the query target; and determining, based on comparison between the ciphertext of the query target and ciphertexts of level-2 index points corresponding to the multiple level-1 index points, the multiple associated index points of the query target from the level-2 index points.

In some embodiments, the query target further includes a query value in a second attribute column, and the restoring a corresponding coded ciphertext to a plaintext row identifier, to obtain each corresponding candidate row from the out-of-order data table further includes the following: obtaining a first plaintext row identifier set based on plaintext row identifiers restored from coded ciphertexts corresponding to the multiple associated index points; detecting an intersection set of the first plaintext row identifier set and a second plaintext row identifier set, to obtain multiple common row identifiers, where the second plaintext row identifier set includes each plaintext row identifier determined based on each index point associated with the query target in the second attribute column, and each index point associated with the query target in the second attribute column is determined based on comparison between the ciphertext of the query target and ciphertexts of a plurality of index points corresponding to the second attribute column; and determining each row corresponding to each common row identifier in the out-of-order data table as a candidate row.

In some embodiments, the coded ciphertext of the plaintext row identifier is updated and used to recreate an index when one of the following is satisfied: a predetermined moment arrives; a third-party system is idle; or a quantity of restored plaintext row identifiers reaches a predetermined quantity threshold.

According to a second aspect, a federated data query apparatus based on privacy preserving is provided, used by a third party to securely query target data from a federated data table of a plurality of data parties. The federated data table is an attribute ciphertext data table securely created based on federated attribute data of the plurality of data parties for multiple service subjects. The apparatus is disposed in the third party and includes the following: an index unit, configured to obtain multiple associated index points of a query target based on comparison between a ciphertext of the query target and ciphertexts of a plurality of index points corresponding to a first attribute column, where each index point corresponding to the first attribute column is a data segmentation point for indexes created based on attribute value sorting of the first attribute column, and the query target includes a query value in the first attribute column; a row identification unit, configured to obtain a coded ciphertext of each of row identifiers corresponding to the multiple associated index points and restore a corresponding coded ciphertext to a plaintext row identifier, to obtain each corresponding candidate row from an out-of-order data table pre-obtained by disordering the federated data table, where a row identifier of each row is determined through row coding for the out-of-order data table; and a target determining unit, configured to compare a ciphertext of an attribute value of each of candidate rows in the first attribute column with the ciphertext of the query target, to determine a final target row from the candidate rows to obtain target data in the target row.

According to a third aspect, a computing device is provided, including a memory and a processor. The memory stores executable code, and when executing the executable code, the processor implements the method according to the first aspect.

According to the method and the apparatus provided in embodiments of this specification, in a process of processing, by a third party, a federated data table formed based on data of a plurality of data parties, if related data need to be obtained based on sorting of multiple attribute columns of the data table, when the federated data table is sorted based on attribute values of the attribute columns, a row identifier is introduced for an out-of-order data table obtained by disordering the federated data table, and an index is created based on the row identifier. The row identifier is determined by the third party and exists in a form of ciphertext in an index table. A row identifier of a candidate row can be restored to a plaintext. As such, cryptographic query efficiency is improved, and it can be ensured that cryptographic data in the federated data table is not leaked.

BRIEF DESCRIPTION OF DRAWINGS

To describe the technical solutions in embodiments of this application more clearly, the following briefly describes the accompanying drawings for describing the embodiments. Clearly, the accompanying drawings in the following descriptions show merely some embodiments of this application, and a person of ordinary skill in the art can still derive other accompanying drawings from these accompanying drawings without creative efforts.

FIG. 4 is a diagram illustrating a data query procedure based on privacy preserving, according to some embodiments; and FIG. 5 is a block diagram illustrating a data query apparatus based on privacy preserving, according to some embodiments.

DESCRIPTION OF EMBODIMENTS

Technical solutions provided in this specification are described below with reference to the accompanying drawings.

A service scenario that is a basis for providing the technical concept in this specification is first described.

In a process of jointly processing data of a plurality of data parties, there are usually service scenarios such as joint storage and joint query. For example, in a scenario of analyzing user information, data party 1 holds attribute values of physical condition attributes such as heights and weights of users, data party 2 holds attribute values (specific salary amounts) of salary attributes of the users, and data party 3 holds attribute values (specific debit and credit amounts) of debit and credit attributes of the users. Some service situations are as follows: Data party 1 or data party 3 queries a sum of salaries of users whose salaries rank top N, or data party 1 queries debit and credit statuses of users whose salaries rank top N, or a sum of salaries of users whose heights rank top M and a sum of salaries of users whose weights rank top M are queried, or there is another query need, etc.

Data held by a single data party are limited (not comprehensive), and data parties do not want to leak local data to each other. Secure joint data processing can be implemented with the help of a third party when data exchange between data parties is insufficient to ensure data security, device performance cannot satisfy time validity of data processing, etc. When the third party assists in performing a data federation scenario, each data party can send held data to the third party in advance, and the third party performs joint sorting based on the data sent by each data party. When the third party needs to obtain corresponding data from federated data for subsequent service processing for a service processing request (for example, a query request) sent by a data party or another service party, a data query result can be obtained based on a corresponding sorting result.

Figure 1:
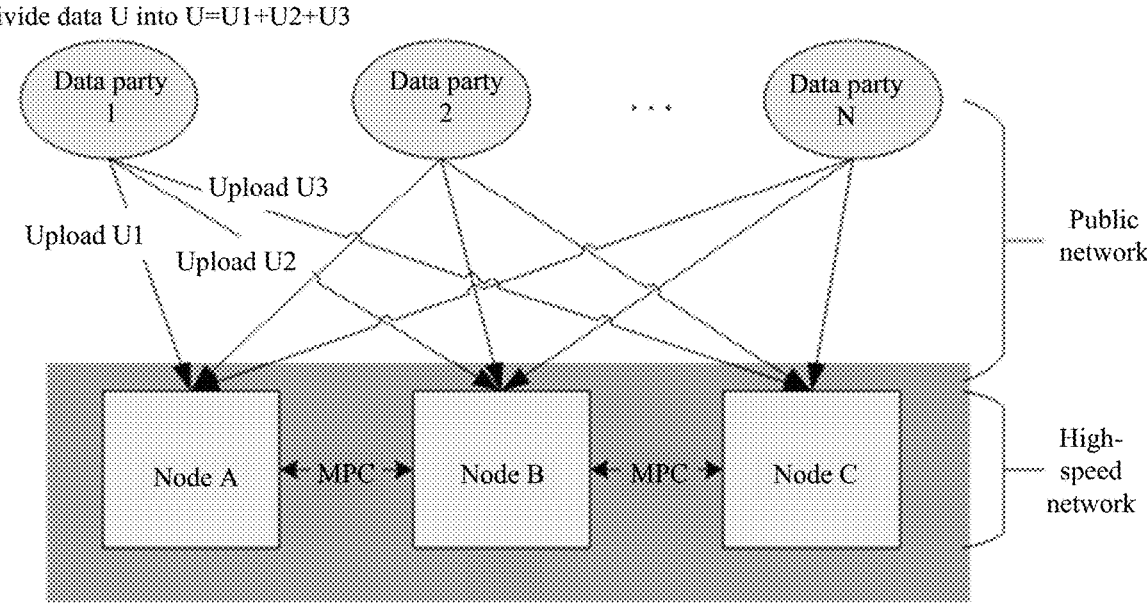
FIG. 1 is a diagram illustrating a specific implementation architecture of trusted cryptographic computing.

The technical solutions of this specification are proposed based on a scenario that the third party constructs a database by using a trusted cryptographic computing (TrustEd Cryptographic Computing, TECC for short) architecture. Trusted cryptographic computing is a secure and efficient cryptographic computing method, and can compute a common result for a plurality of data parties without leaking data of any party. FIG. 1 shows an implementation architecture of trusted cryptographic computing. As shown in FIG. 1, a third party can use a plurality of nodes (such as a node A, a node B, and a node C) for joint computing. The plurality of nodes can construct a trusted cryptographic computing framework through secure multi-party computation (MPC). In other words, the nodes of the third party do not leak data to each other, and securely complete various types of data processing. For example, a comprehensive ciphertext database is created, and data are obtained based on the ciphertext database to perform various types of service processing.

In FIG. 1, a quantity of nodes of the third party and a quantity of data parties are both example descriptions, and can be determined based on an actual situation in practice. Each data party can be in a network environment of a public network, and each node of the third party can be in a specific network environment. A high-speed network shown in FIG. 1 can be a network capable of high-speed computing and communication. High-speed computing is usually determined by a central processing unit of a device, and high-speed communication can be implemented by improving a communication capability (for example, quantum communication), reducing a quantity of communication gateways (for example, in a same local area network), etc. As such, a plurality of nodes are separated from the public network via a specific network, and can interact with a device in the public network. Specifically, interaction with the public network device (for example, each data party shown in FIG. 1) is generated by receiving or sending data. In a data processing process, in a "specific network", interaction is implemented between node devices through MPC. An implementation party of the TECC can be referred to as a service party or a third party (collectively referred to as a service party below), and is configured to provide a service for joint data processing between data parties.

As shown in FIG. 1, to prevent any node from learning of data of a data party, a single data party can divide local data into a plurality of components before providing the local data for the TECC architecture. For example, data party 1 can divide local data U into a sum of U1, U2, and U3, and U1, U2, and U3 are respectively three components of data U. The single data party can send ciphertexts of the plurality of divided components to each node. As such, for each piece of data from a data party, each node holds one component of the data, and the corresponding data can be restored only after all components on a plurality of nodes are obtained.

The nodes of the third party perform secure multi-party computation (MPC) on received data, that is, obtain a corresponding processing result without leaking local data to each other. A manner of MPC can be, for example, secret sharing, homomorphic encryption, or a garbled circuit. In the TECC, to further ensure security and computing performance, each node can be in a high-speed network (for example, a local area network) capable of high-speed computing and communication, and have little interaction with a public network in an entire computing process. Therefore, trusted cryptographic computing can balance security and computing performance to achieve an ideal state.

In some optional implementations, a secure channel can be further established between a single data party and each node to enhance data security. The secure channel can be established by using at least one of an agreed protocol, a key, a dedicated communication interface, etc. Details are not described here again. In some other optional implementations, to better balance security and computing performance, each node of trusted cryptographic computing is constructed based on a trusted execution environment (TEE). The TEE is a secure area constructed by software and hardware on a computing platform, and can ensure that code and data loaded in the secure area are preserved in terms of confidentiality and integrity. The TEE technology can ensure that data of a participant exists in only the TEE, and none of a host, an owner, etc. of the TEE can obtain a data plaintext (in a case that the TEE is not broken). In addition, each TEE is in contact with only a data component from the beginning to the end, that is, an attacker cannot obtain valid information even if the attacker breaks a TEE and steals or modifies the TEE.

To prevent data privacy from being leaked, data sent by each data party to the third party can be in a form of ciphertext. A data ciphertext of each data party can be uploaded to the third party in advance. Therefore, the third party can sort the ciphertext data and create an index in advance. Table 1 shows a federated data table jointly created by the nodes of the third party. The federated data table is described here because the database table is jointly created based on data of a plurality of data parties. In addition, based on the above-mentioned descriptions, data provided by the plurality of data parties for the third party are in a form of ciphertext. Therefore, the federated data table can also be referred to as a ciphertext data table.

TABLE 1

| Schematic federated data table | | | | | |
| --- | --- | --- | --- | --- | --- |
| Attribute item 1 | Attribute item 2 | Attribute item 3 | Attribute item 4 | . . . | Attribute item V |
| Attribute value ciphertext 11 | Attribute value ciphertext 12 | Attribute value ciphertext 13 | Attribute value ciphertext 14 | . . . | Attribute value ciphertext 1V |
| . . . | . . . | . . . | . . . | . . . . . . | |
| Attribute value ciphertext N1 | Attribute value ciphertext N2 | Attribute value ciphertext N3 | Attribute value ciphertext N4 | . . . | Attribute value ciphertext NV |

When the federated data table shown in Table 1 is constructed, the data of the plurality of data parties need to be aligned. The data parties can agree on a data alignment rule. On the one hand, alignment is performed by row. To be specific, each row corresponds to a consistent target object. For example, the first row corresponds to target object 1 (for example, user 1), the second row corresponds to target object 2 (for example, user 2), . . . , and the $N^{th}$ row corresponds to target object N. On the other hand, alignment is performed by column. To be specific, data are arranged based on a predetermined sequence of attribute items for each target object. For example, the first column corresponds to attribute item 1, the second column corresponds to attribute item 2, . . . , the $V^{th}$ column corresponds to attribute item V, etc. Each data party can send a local attribute value to the third party according to the alignment rule. In practice, the target object can be a user, an article, a service item, etc. In some embodiments, the target object may not appear in the federated data table. To be specific, the data parties only agree on the alignment rule for the target object, but do not send an identifier of the target object (for example, a case shown in Table 1). In some other embodiments, a single target object can be described by using a predetermined target identifier (for example, a user name or a product number), and each data party can send target object ciphertexts to the third party after unifying the target object ciphertexts. In this case, the target object identifier ciphertexts can be considered as an attribute column in the federated data table.

If the third party is an architecture in a form of TECC, the federated data table can be securely stored in a plurality of nodes. For example, a single node holds one segment of the federated data table. When federated data tables of all nodes are correspondingly added based on elements, a complete federated data table can be synthesized. In the federated data table segment held by the single node, for a single element, a random divided component of a data party is used as a component ciphertext, or a random divided component is encrypted in a predetermined encryption manner (for example, hash encryption) to obtain a ciphertext.

A person skilled in the art can understand that sorting and index creation are important steps in a data query process. When the third party performs joint sorting on the data sent by the data parties, a sorting manner based on a similar order-preserving encryption manner can be used in a conventional technology. In this sorting manner, the third party obtains an attribute value ciphertext uploaded by each data party to obtain a table to be sorted. A user identifier and an attribute value of each attribute item in the table are in ciphertext (for example, one row in the table stores attribute value ciphertexts of one user for a plurality of attribute items, and one column stores attribute value ciphertexts of all users for one attribute item). However, a sequence relationship between rows or columns is clear (which is conducive to initial data alignment). For example, the first row corresponds to user 1, the second row corresponds to user 2, etc. Subsequently, the third party performs sorting base on one or more attribute items, to create an index.

Sorting can be performed by row or by column. For ease of description, that sorting is performed by row is used as an example for description in this specification, but a case of sorting by column is not excluded. Sorting by row means that data in one row are fixed and a position of the entire row in a column is arranged. Generally, in a case of sorting by row, each row in a database corresponds to one piece of service data, and each column corresponds to a data item in each piece of service data. For example, in the above-mentioned example, one row corresponds to one user, and one column corresponds to one service attribute. Sorting by row is performed on a user. A sorting basis can be one or more service attributes. When sorting of a single user changes, sorting of an entire row of data changes. In the case of sorting by row, an index can be created based on data in one or more columns.

In a conventional technology, a method for creating an index point is, for example, bucketing, quicksort cut-off, etc. In the bucketing manner, bucketing points (that is, bucket segmentation points, for example, height 150 cm, 160 cm, etc.) can be selected, and these bucket segmentation points are used as index points. The bucketing points can be specifically selected based on historical experience. Alternatively, "a maximum value and a minimum value can be first calculated, and then a range between the maximum value and the minimum value can be equalized", and a specific bucket that each element belongs to can be determined based on comparison between a to-be-sorted column element (attribute ciphertext) and these bucketing points. In this manner, identifiers of all service subjects need to be compared with the segmentation points, and attribute value distribution of service attributes may be leaked. In addition, when there are a large quantity of service subjects in a segmentation interval (corresponding to a range of one segmentation step size), retrieval efficiency may be low. Quicksort cut-off can be performed in a recursive manner. If a segment is less than a specific threshold (for example, an element quantity is less than 1000), recursion is stopped, and all obtained segmentation points are used as index points. In this manner, specific rankings of the segmentation points are leaked, and if an index is created in a plurality of columns, approximate rankings of each attribute item in these columns are obtained.

According to a specific scenario, for example, if data party 1 queries a third party for a debit and credit status of a user whose monthly salary is 10000 yuan, data party 1 can divide a data identifier (for example, monthly salary amount U=10000) of a query target into a plurality of components, and send the components (for example, U1, U2, and U3) to nodes through a secure channel. Optionally, data party 1 can securely send ciphertexts of the components of U to the nodes of the third party, and the nodes of the third party receive the ciphertexts of the components, and jointly query a ciphertext database by using the components, to feed back a query result. For example, in the above-mentioned service scenario, when data party 1 queries debit and credit statuses of users whose salaries rank top N, or a sum of salaries of users whose heights rank top M and a sum of salaries of users whose weights rank top M are queried, or there is another query need, a service party needs to perform joint sorting on data in the ciphertext database through secure multi-party computation, to obtain a data query result based on a corresponding sorting result. Each node feeds back a query result to the individual participant through secure multi-party computation.

In another service scenario, a data party can further send another service processing request to the third party, for example, predict a default risk of a user with a lowest salary by using a credit condition of the user in last three years. It can be understood that in such a case that the third party needs to continue to perform subsequent service processing, the third party can continue to perform corresponding data processing within a local area network range without feeding back corresponding data.

In various data query scenarios, data query involving a plurality of service items (for example, a plurality of attribute items in the above-mentioned example) is inevitably encountered. For example, data party 1 queries debit and credit statuses of users whose salaries rank top N, or a sum of salaries of users whose heights rank top M and a sum of salaries of users whose weights rank top M are queried, etc. In a process that the third party creates an index for the data in the above-mentioned sorting manner, a sequence relationship between rows in a sorting column may be exposed when the data in the table are queried. For example, query target attribute items include a weight attribute item and a salary attribute item of a user. After the third party sorts attribute value ciphertexts of the weight attribute item and the salary attribute item in the table, a single node of the third party may obtain privacy information that a salary of a person whose weight ranks $5^{th}$ ranks $1^{st}$. Such non-intuitive information leakage is still not conducive to privacy data preserving.

Therefore, this specification provides a technical solution for federated data query based on privacy preserving. The technical solution is applicable to a scenario that data of a plurality of data parties are securely held by a third party in a corresponding ciphertext database and the third party securely obtains target data from the ciphertext database based on a service need. In the technical solution, an index is created based on a sorting result of sorting federated data of the plurality of data parties in advance, to avoid that a single node of the third party speculates privacy data based on the sorting result. A technical problem in this specification is proposed on a basis that a third party is a TECC architecture. However, in actual applications, the third party is not limited to the TECC architecture. The third party can alternatively be a single device or another secure form. Implementations are not limited in this specification.

The following first describes a process that a third party sorts a federated data table to create an index.

Figure 2:
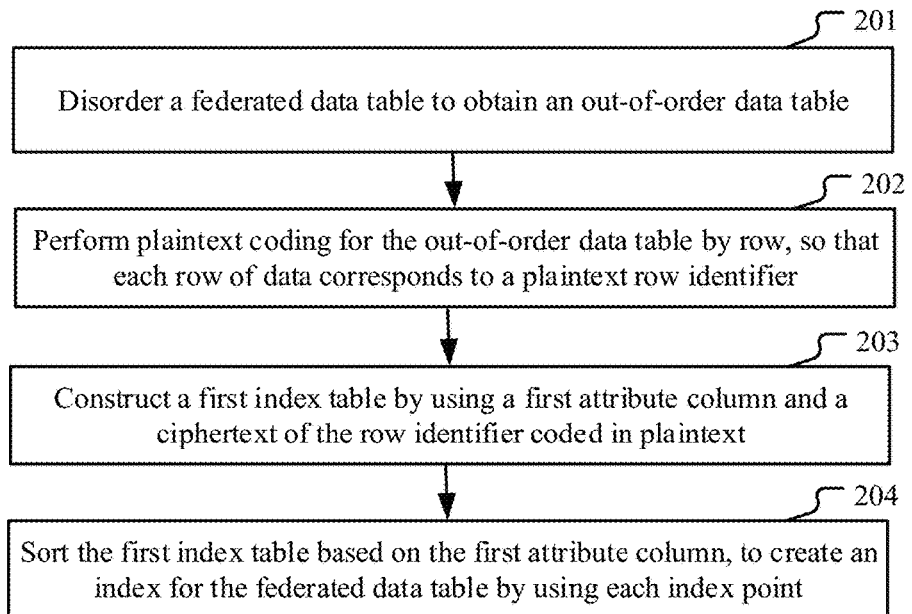
FIG. 2 is a schematic flowchart illustrating that a third party cryptographically creates an index for a federated data table, according to some embodiments.

FIG. 2 shows an index table creation procedure performed by a third party according to some embodiments. Notably, when the third party is one device, the procedure is completed by the single device of the third party. When the third party is a cluster similar to a TECC, the procedure can be completed by the corresponding cluster through secure multi-party computation.

As shown in FIG. 2, the index table creation procedure performed by the third party can include the following steps: Step 201: Disorder a federated data table to obtain an out-of-order data table. Step 202: Perform plaintext coding for the out-of-order data table by row, so that each row of data corresponds to a plaintext row identifier. Step 203: Construct a first index table by using a first attribute column and a coded ciphertext of the row identifier coded in plaintext. Step 204: Sort the first index table based on the first attribute column, to obtain each index point corresponding to the first attribute column.

First, in step 201, the federated data table is disordered to obtain the out-of-order data table. The federated data table is jointly created by the third party based on data of a plurality of data parties, and details are not described here again.

Disordering the federated data table is disordering a sequence relationship between rows in the table. In a process of creating an index for a ciphertext data table, disordering and sorting are usually used cooperatively. Disordering is performed once before sorting. As such, during sorting, positions of adjacent rows in the data table cannot be tracked, so that exposure of a sequence relationship (for example, a target object at a position a in a first attribute item sorting column is a target object at a position b in a second attribute item sorting column) between rows in a sorting column in the data table is avoided.

Figure 3:
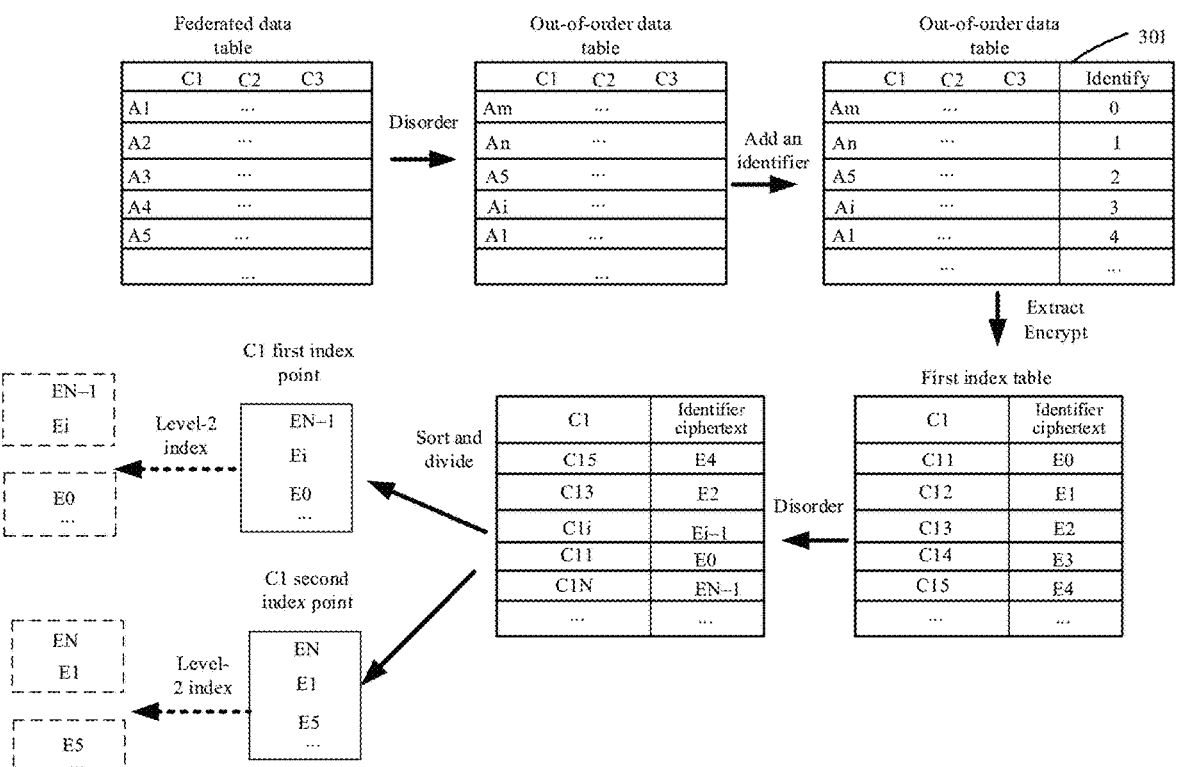
FIG. 3 is a diagram illustrating that a third party cryptographically creates an index for a federated data table based on a single attribute column, according to a specific example.

Disordering can be performed in a predetermined manner, or may be random, that is, a row of service data is arranged in a random row after disordering. As shown in FIG. 3, in each row of the out-of-order table, a mapping relationship between a target object and an attribute value ciphertext of each attribute item corresponding to the target object does not change, but a row arrangement sequence changes. In particular, in the TECC architecture, disordering can be performed through secure multi-party computation. For example, secure synchronization is performed for adjustment from one row to another row.

Next, in step 202, plaintext coding is performed for the out-of-order data table by row, so that each row of data corresponds to a plaintext row identifier. The row identifier can be generated in a predetermined manner, and is used to identify an identifier of a corresponding row. The row identifier can include at least one of a number, a letter, a symbol, etc. For example, rows in FIG. 3 are sequentially coded with 0, 1, 2, 3 . . . . A row of data identified by a single row identifier can be located by using the single row identifier. In a subsequent processing process, a mapping relationship between the single row identifier and the row corresponding to the single row identifier remains unchanged. Regardless of disordering of the data table, the row of data initially identified by the single row identifier can still be found based on the single row identifier. In FIG. 3, data table 301 is used to indicate an out-of-order data table that a plaintext row identifier is added to. Notably, in the technical concept of this specification, table 301 is a basis for creating each column of indexes. In a valid use process of an index created based on a current row identifier, table 301 can be a query basis that always exists. In an actual scenario, table 301 can be used as a base table for creating an index for each attribute column, and for example, is referred to as a mother table for creating an index.

Then, according to step 203, the first index table is constructed by using the first attribute column and a ciphertext of each row identifier. Because the row identifier coded in plaintext is closely combined with row data, data privacy may be leaked if the plaintext row identifier is directly used for indexing. Therefore, in a subsequent indexing process, a related table can be created by using the ciphertext of the row identifier. The ciphertext of the row identifier can be obtained by encrypting the row identifier in a predetermined encryption manner, or can be stored in each node for encryption by using a component divided in a random component form. As such, any device of the third party cannot directly deduce a plaintext row identifier from locally held data independently.

In embodiments of this specification, when a specific row of data is queried, a related index is usually created based on a column. For example, if users whose salaries rank top 100 are queried, a sorting and query are performed based on a column of an attribute item corresponding to "salary". Therefore, a column (for example, denoted as a first attribute column) that may be used as an index can be extracted, and is used together with a ciphertext of a row identifier to create a corresponding index table. For example, the index table is referred to as a first index table here.

Referring to FIG. 3, it is assumed that identifier columns are 0, 1, 2, 3 . . . , corresponding ciphertexts are denoted as E0, E1, E2, E3 . . . , and an attribute column that an index is created for is attribute column C1. In this case, each attribute value ciphertext of column C1 and a ciphertext column of a row identifier can be extracted to form the first index table. As such, a size of a table to be sorted is greatly reduced.

If an index further needs to be created for the second column, for example, attribute column C2, each attribute value ciphertext of column C2 and a ciphertext column of a row identifier can be extracted to form a second index table. By analogy, a corresponding index table can be created for each attribute column.

Further, in step 204, the first index table is sorted based on the first attribute column, to obtain each index point corresponding to the first attribute column, and an index is created for the federated data table based on the first attribute column.

The sorting here is usually performed based on sizes of attribute values. For example, when column C1 indicates a salary, ranking is performed in descending order or ascending order of salaries. When column C1 indicates weight data, sorting is performed based on weights. A sorting manner here can be bucketing, quicksort cut-off, etc. Details are not described here again. Rows in a target sorted table obtained after sorting are sorted in descending order (or ascending order) of attribute values corresponding to a target attribute item. For example, in the target sorted table, a row including a largest attribute value ciphertext corresponding to the target attribute item is the first row, and a row including a second largest attribute value ciphertext corresponding to the target attribute item is the second row. By analogy, a row including a smallest attribute value ciphertext corresponding to the target attribute item is the $N^{th}$ row. In a process of sorting the attribute values, when the attribute values are ciphertexts, sizes of the attribute values are securely compared according to an encryption rule. Details are not described here again. For sorting, the third party can obtain a size comparison result of the attribute value ciphertexts. For example, through secure comparison, if an attribute value of the third row is greater than an attribute value of the second row, each node can exchange the third row and the second row in sequence.

An index point can be understood as a data segmentation point determined for convenience of query. Two adjacent index points can specify an attribute value range. For example, an index is created for a height of a user, and one index point can be determined every 10 centimeters. In this case, when data of a user with a given height (for example, 161 centimeters to 168 centimeters) are queried, a given height value (for example, 165) can be compared with each index point, or an endpoint of a given height range can be compared with each index point, to rapidly obtain candidate data with a small range.

The index point is usually associated with an attribute value corresponding to an attribute column, and can be predetermined, or can be divided based on a quantity of target objects. For example, in a salary attribute column, in a case of a given index point, the given index point is, for example, 2000 yuan, 5000 yuan, 10000 yuan, or 30000 yuan, and a segmented attribute value range is, for example, 0 to 2000 yuan (excluded), 2000 yuan (included) to 5000 yuan (excluded), 5000 yuan (included) to 10000 yuan (excluded), 10000 yuan (included) to 30000 yuan (excluded), and more than 30000 yuan (included). In this case, an attribute value of the salary attribute column can be compared with the given index point, to determine that a corresponding row belongs to a range segmented by a specific index point or specific index points. In this case, quantities of pieces of data corresponding to all index points can be unequal.

For another example, division is performed based on a quantity of target objects, and an index point is created every 1000 persons. In this case, 100 index points can be created for 100000 persons. Each index point is determined, for example, based on a salary amount corresponding to the $1000^{th}$ person, a salary amount corresponding to the $2000^{th}$ person, a salary amount corresponding to the $3000^{th}$ person, . . . , etc. in a sorting result. Each index point can segment 1000 persons. The index point can be a salary amount corresponding to a corresponding ranking, or can be another value determined based on the salary amount that can be distinguished from a next salary amount. For example, the salary amount corresponding to the $1000^{th}$ person can be used as an index point, and 1000 pieces of data from 0 to the salary amount (included) are obtained through segmentation. Alternatively, a salary amount of the $1001^{st}$ person can be used as an index point, and 1000 pieces of data from 0 to the salary amount (excluded) are obtained through segmentation. Alternatively, a value (such as an average value) between the salary amount corresponding to the $1000^{th}$ person and the salary amount of the $1001^{st}$ person can be selected as an index point . . . .

Notably, each index point actually divides data into a plurality of data ranges. For example, multiple pieces of data between two adjacent index points are one data range (for example, a salary range of 2000 yuan to 5000 yuan). According to some embodiments, index points of a single attribute column may not include endpoints, but include only an intermediate segmentation point that segments data. As such, a quantity of index points is 1 less than a quantity of attribute value ranges that segment data. According to some other embodiments, index points of a single attribute column can include one endpoint. As such, a quantity of index points is consistent with a quantity of ranges that segment data. In this case, optionally, each index point can correspond to an attribute value range formed by the index point and an adjacent index point smaller or larger than the index point. According to some other embodiments, index points of a single attribute column can include two endpoints. As such, a quantity of index points is 1 greater than a quantity of attribute value ranges that segment data. Optionally, an attribute value range can be described by using two adjacent index points.

According to some possible designs of this specification, multiple pieces of corresponding data can be further segmented based on each index point, to obtain each retrieval sub-table. A segmentation method is described above. FIG. 3 illustrates an example that a single index point corresponds to a single index sub-table. In some optional embodiments, data in a single index sub-table can be arranged based on a size of an attribute value in an attribute column of a corresponding index. As shown in FIG. 3, a first index point of attribute column C1 corresponds to a first sub-table, which includes multiple row identifier ciphertexts arranged in a size order. In some other optional embodiments, data in the first sub-table can be data disordered again after segmentation is performed based on an index point.

According to some possible designs, each sub-table described above is considered as a level-1 index, and a corresponding index point is considered as a level-1 index point. In this case, a level-2 index can be further constructed for each sub-table. As shown in FIG. 3, the level-2 index can segment data by using a level-2 index point. A manner for determining the level-2 index point is similar to the manner for determining the level-1 index point, and the sub-table with the level-1 index is segmented at a finer granularity. It can be understood that each index sub-table with the level-1 index is created based on sorting for a target attribute column. Therefore, the level-2 index can be directly created based on a sorting result. For example, one sub-table with the level-1 index corresponds to 1000 users, and one index point of the level-2 index corresponds to 200 users. In this case, for 1000 attribute value ciphertexts corresponding to the level-1 index point, one index point can be created every 200 attribute value ciphertexts in sequence.

Generally, the level-2 index can further narrow a data range when an amount of data of the level-1 index is large, thereby accelerating a data query process. In some optional embodiments, an index of level 3 or a higher level can be further created, to further improve a data query speed.

FIG. 2 and FIG. 3 show, in different forms, processes of creating an index based on a single attribute column. In practice, indexes can be further created for a plurality of attribute columns in a similar manner. For example, in addition to the salary attribute column, step 203 and step 204 can be further repeated for at least one of an age attribute column, a height attribute column, etc. to determine a corresponding index point and construct a corresponding retrieval table. In FIG. 3, index tables corresponding to a plurality of attribute columns can be constructed based on data table 301.

Based on the above-mentioned index creation process, the third party can create an index for one or more attribute columns in advance. In a specific service processing process, a service scenario based on sorted data may be generated. For example, in a current service processing process, a sum of salaries ranking top 10 in the salary attribute item is needed, or annual incomes of users whose weights rank top 10 are needed, etc. In these service scenarios, a single data party or another service party that is allowed to use federated data may initiate a query request, or a third party may need to obtain corresponding service data when processing another service. During data query, the third party can perform query based on a query need and a corresponding index.

FIG. 4 shows a federated data query procedure based on privacy preserving according to some embodiments. In the procedure, data can be queried from a federated data table based on an index created in the manner shown in FIG. 2, FIG. 3, etc. Specifically, the third party can perform the following steps: Step 401: Obtain multiple associated index points of a query target based on comparison between a ciphertext of the query target and ciphertexts of a plurality of index points corresponding to a first attribute column, where each index point corresponding to the first attribute column is a data segmentation point for indexes created based on attribute value sorting of the first attribute column, and the query target includes a query value in the first attribute column. Step 402: Obtain a coded ciphertext of each of row identifiers corresponding to the multiple associated index points, where a row identifier of each row is determined through row coding for an out-of-order data table pre-obtained by disordering the federated data table. Step 403: Restore a corresponding coded ciphertext to a plaintext row identifier, to determine a candidate row from the out-of-order data table. Step 404: Compare a ciphertext of an attribute value of each of candidate rows in the first attribute column with the ciphertext of the query target, to determine a final target row from the candidate rows to obtain target data in the target row.

In step 401, the multiple associated index points of the query target are obtained based on the comparison between the ciphertext of the query target and the ciphertexts of the plurality of index points corresponding to the first attribute column. The query target can correspond to an exact value or a query range. The first attribute column can be any attribute column in the federated data table, and is a query target column here. For example, if a salary of a user whose weight is 100 kg is queried, the query target corresponds to an exact value 100 kg, and correspondingly the first attribute column is a weight attribute column. For another example, if screening is performed for an employee whose work experience is 10 to 20 years, the query target corresponds to a range of 10 to 20 years, and the first attribute column is a work experience attribute column. If screening is performed for an employee whose age is 35 to 45, the query target corresponds to a range of 35 to 45 years of age, and the first attribute column is an age attribute column. Here, the query target is in a form of ciphertext, and the ciphertext of the query target can be determined based on a query request of a data party or another service party, or can be determined based on an intermediate result of a service currently processed by the third party.

If the ciphertext of the query target is determined based on a query request of a data party or another service party (which can be collectively referred to as a querier), the querier can convert the query target (for example, an attribute value of an attribute column to be queried) into a corresponding ciphertext based on a need of a third-party architecture and send the ciphertext to the third party. For example, in a TECC architecture, the querier can randomly divide a value corresponding to the query target into a plurality of components, and each component is sent to one node of the third party. Therefore, the value of the attribute column to be queried is confidential for each node of the third party (each node obtains only one component). These components can be referred to as component ciphertexts. For example, to query a salary of a user whose weight is 100 kg, data party 1 can send an attribute value ciphertext of the weight attribute 100 kg to the third party.

If the ciphertext of the query target is determined based on an intermediate result of a service currently processed by the third party, the third party can obtain the corresponding intermediate result as the query target when processing another service requested by a data party or another service party. It can be understood that, to preserve data privacy, the third party can use a ciphertext form in a data processing process. The query target used as the intermediate result is also in a ciphertext form. In this case, the corresponding intermediate result is the ciphertext of the query target. For example, the service currently processed by the third party is collecting statistics about an income status of a three-high patient. In this case, the intermediate result can be that an initial onset age of the three-high patient is 40 to 50 years of age. Subsequently, the federated data table needs to be queried to collect statistics about an income status of a population aged from 40 to 50 years, etc.

Similarly, the query result for the query target can be directly used as an intermediate result for subsequent service processing. For example, statistics about top 5 items of spending pensions by retirees in the last five years are collected. The third party can first query row data of the retirees in the last five years as an intermediate result based on an age of each user, and then collect statistics about a sum of expenditure amounts of the pensions for all expenditure attribute items in the rows.

The index points are based on sorting, and each index point can segment each attribute value range of a corresponding attribute column. Therefore, an index point associated with the query target in the first attribute column corresponding to the query target can be determined as an associated index point by comparing the ciphertext of the query target with a ciphertext of the index point. When the third party uses a component ciphertext, both the query target and the index point are stored in the third party in a component form, and the third party can compare sizes of the two ciphertexts in a manner such as secure comparison. A ciphertext comparison result of the query target and the index point can be determined in a plaintext manner, to determine, based on a service need, an attribute value range that the query target falls into. The attribute value range that the query target falls into can be segmented by the associated index point.

It can be understood that a manner of determining the associated index point is associated with a manner of segmenting attribute values by the index point and a form of the query target. For example, when a single index point corresponding to the first attribute column is used as an intermediate segmentation point to segment attribute values of the first attribute column into a plurality of attribute value ranges, the ciphertext of the query value can be sequentially compared with index points corresponding to the first attribute column, and then an index point corresponding to an attribute value range that the query value belongs to is determined as an association index point of the query target based on a size comparison result. For example, when the query value is greater than a first index point and less than a second index point, the adjacent first index point and second index point can be determined as associated index points. If the comparison result is that the query value is less than a smallest index point, the smallest index point can be determined as an associated index point of the query target, or if the comparison result is that the query value is greater than a largest index point, the largest index point can be determined as an associated index point of the query target. In another case, the associated index point can be determined in another manner. Implementations are not exhausted here.

In some optional implementations, when the third party pre-creates a plurality of levels of indexes, a level-1 index associated with the query target can be first determined by comparing the ciphertext of the query target with an index point ciphertext of the level-1 index, for example, a corresponding level-1 index position or an index sub-table is obtained, and then the ciphertext of the query target is compared with an index point ciphertext of a level-2 index corresponding to the associated level-1 index, to obtain a level-2 index associated with the query target. By analogy, an index point ciphertext of a last-level index (for example, level-2 index) is obtained through comparison, and the last-level index point is determined as an associated index point of the query target. As such, a candidate row range of an index can be reduced step by step, to reduce a subsequent data processing amount.

Then, in step 402, the coded ciphertext of each of the row identifiers corresponding to the multiple associated index points is obtained. It can be understood that the associated index point can segment rows corresponding to a plurality of attribute values including the query target. In an index creation process, each attribute value row further corresponds to a row identifier obtained through row coding for the out-of-order data table, and the row identifier appears in the index table in a form of coded ciphertext. Therefore, a coded ciphertext corresponding to each row can be obtained.

Next, in step 403, the corresponding coded ciphertext is restored to the plaintext row identifier, to determine the candidate row from the out-of-order data table. It can be understood that, to obtain data in a related row in a related row ciphertext data table, the third party can restore the coded ciphertext to the plaintext identifier. For example, in the TECC architecture, for a coded ciphertext stored in each node in a random component manner, plaintext data of a row identifier can be obtained by mutually disclosing local components by nodes.

In a process of creating an index by the third party, before the index table is extracted, there is an out-of-order data table that a row identifier is added to. As shown in table 301 in FIG. 3, a relationship between a plaintext row identifier and data in each row in the out-of-order data table is recorded. Therefore, data of a corresponding row, that is, the candidate row, can be obtained by using a plaintext row identifier corresponding to the query target.

If the third party pre-creates a plurality of columns of indexes and current query is query based on a federated condition for the plurality of columns (for example, a health condition of a user whose age is 30 to 45 years and whose weight is greater than 75 kg is queried), an associated index point (for example, 40 years of age and 50 years of age) corresponding to a first index range (for example, age from 30 to 45 years) and a corresponding row (for example, rows whose age attribute values are 30 to 40 years and 40 to 50 years) can be determined in an index of the first attribute column, a first plaintext row identifier set is obtained based on a plaintext row identifier restored from a coded ciphertext in each row corresponding to the first index range, an associated index point (for example, 75 kg) corresponding to a second index range (for example, weight greater than 75 kg) and a corresponding candidate row (for example, a row whose weight attribute value is greater than 75 kg) can be determined in an index of the second attribute column, and a second plaintext row identifier set is obtained based on a plaintext row identifier restored from a coded ciphertext in each row corresponding to the second index range. Then, an intersection set of the first plaintext row identifier set and the second plaintext row identifier set is detected to obtain plaintext data of multiple common row identifiers. Further, a row corresponding to each common row identifier in the out-of-order data table (table 301 in FIG. 3) can be determined as a candidate row.

In step 404, the ciphertext of the attribute value of each of the candidate rows in the first attribute column is compared with the ciphertext of the query target, to determine the final target row from the candidate rows to obtain the target data in the target row. It can be understood that the candidate row is obtained based on comparison between the ciphertext of the query target and a small quantity of index points, and the obtained candidate row can greatly narrow a search range of the target row. However, in practice, the ciphertext of the query target and a ciphertext of an attribute value of the candidate row in the first attribute column further need to be compared, to screen out the target row.

The comparison between the ciphertext of the query target and the ciphertext of the attribute value of the candidate row in the first attribute column can also include at least one of value-to-value comparison, value-to-range comparison, or range-to-range comparison. The value-to-value comparison can be comparison about whether two values are the same, the value-to-range comparison can be comparison between a value and two endpoints of a range, and the range-to-range comparison can be cross comparison between endpoints of two ranges. Details are not described here again.

For example, if the query target is data of a user whose salary ranges from 5000 yuan to 6000 yuan, the candidate row can be multiple rows determined based on an index point of the salary attribute column, for example, a row in which a salary ranges from 5000 yuan to 10000 yuan. A salary attribute value of a single candidate row is compared with a ciphertext of the range 5000 yuan to 6000 yuan of the query target, so that a candidate row in which a salary attribute value falls into 5000 yuan to 6000 yuan can be obtained as a target row, and ciphertext data of the target row can be obtained. In some embodiments, a quantity of target rows satisfying a query condition may be 0. In the TECC architecture, secure comparison can be used to compare ciphertext values. Details are not described here again.

After the third party obtains the ciphertext data of the target row, the ciphertext data can be fed back to the querier as a query result, or can be used as an intermediate result of a current service for subsequent processing. For example, users whose salaries are between 5000 yuan and 6000 yuan are used as an intermediate result, and ages of the users are averaged, or a data chart is determined, etc.

For example, it is assumed that a current service processing process needs an average value of salaries ranking top 10 in employees aged 35 to 45 years, and correspondingly, used sorted data are data sorted based on an age attribute column. It is assumed that a single index point corresponds to a 10-year-old age segment in the sorted data based on the age attribute column. The third party can compare an index point ciphertext with 35 to determine that the first index point greater than 35 is 40 and the first index point greater than 45 is 50. In this case, coded ciphertexts of row identifiers of index point 40 (corresponding to data of 31 to 40 years of age) and index point 50 (corresponding to data of 41 to 50 years of age) can be obtained. Here, if the third party further creates a level-2 index for the age attribute column, the third party can further narrow a range based on the level-2 index. Details are not described here again. Then, the third party can convert a corresponding coded ciphertext into a plaintext, and determine a row identifier of the plaintext, to obtain a corresponding row from the out-of-order data table as a candidate row, for example, including 10000 pieces of data. Then, the third party can compare an attribute value of the age attribute column in the candidate row including 10000 pieces of data with numeric ciphertexts of the two range endpoints 35 and 45, and determine a candidate row in an age range greater than 35 and less than or equal to 45 as a target row. Then, an average value of attribute value ciphertexts (intermediate results) of all target rows in the salary attribute column can be calculated in a secure cryptographic manner (subsequent service processing).

When the above-mentioned method for creating and using an index is used, multiple coded ciphertexts under a specific column of indexes are restored to plaintexts. If all restored MIDs are from indexes in one column, related information is not leaked. If a plurality of columns of indexes are used, and row identifier codes under different column indexes are the same, approximate rankings of corresponding row identifiers in a plurality of columns are obtained. For example, a salary ranking of one person whose weight ranks 3000 to 4000 is 5000 to 6000. Such single information does not appear to be a significant problem, but more content may be obtained if an attacker analyzes a large amount of such information.

In a data query scenario of the TECC architecture, plaintext restoration, range determining, etc. are involved, and a single node may obtain some information. When a quantity of query times is large enough, information obtained by a single node is enough. In this case, there is a risk of data leakage when the single node is broken by an attacker.

Therefore, in some possible designs, a quantity of restored plaintext row identifiers can be controlled. All indexes are recreated if the quantity of restored plaintext row identifiers is small enough. For example, when only one column-related index is used, index recreation is not needed. Once indexes of more than one column are used, index recreation is performed based on a predetermined condition. In practice, in some optional implementations, a quantity of row identifiers restored to plaintexts before can be recorded, and an index is recreated after the quantity reaches a predetermined quantity threshold. In some other optional implementations, an index recreation process can be asynchronously completed by the third party alone, and does not need to be completed when a query request arrives. Therefore, the third party can perform index recreation periodically (for example, at an interval of one day) or when a system is idle. In addition, the third party can further perform recreation when a local system is idle. Implementations are not limited here.

In the above-mentioned process, according to the method provided in embodiments of this specification, in a process of processing, by a third party, a federated data table formed based on data of a plurality of data parties, if related data need to be obtained based on sorting of multiple attribute columns of the data table, when the federated data table is sorted based on attribute values of the attribute columns, a row identifier is introduced for an out-of-order data table obtained by disordering the federated data table, and an index is created based on the row identifier. The row identifier is determined by the third party and exists in a form of ciphertext in an index table. A row identifier of a candidate row can be restored to a plaintext. As such, cryptographic query efficiency is improved, and it can be ensured that cryptographic data in the federated data table is not leaked.

In particular, when the third party performs trusted cryptographic computing, even if a node is attacked, security of data in the federated data table can be ensured. In this case, when a plurality of attribute columns are involved in data query, to avoid that the row identifier restored to the plaintext leaks a mapping relationship between different attribute columns, the row identifier can be further updated according to a predetermined update rule, and a new index is created by using the updated row identifier, so that privacy preserving for data is enhanced in the third party.

According to some embodiments of another aspect, a data query apparatus based on privacy preserving is further provided. The apparatus can be disposed in a third party that processes a federated data service of a plurality of data parties. In particular, if the third party is a TECC architecture, each node in the TECC architecture is provided with a data query apparatus based on privacy preserving, and these apparatuses cooperate with each other to complete data query in a federated data table through secure multi-party computation.

As shown in FIG. 5, a data query apparatus 500 based on privacy preserving includes the following: an index unit 501, configured to obtain multiple associated index points of a query target based on comparison between a ciphertext of the query target and ciphertexts of a plurality of index points corresponding to a first attribute column, where each index point corresponding to the first attribute column is a data segmentation point for indexes created based on attribute value sorting of the first attribute column, and the query target includes a query value in the first attribute column; a row identification unit 502, configured to obtain a coded ciphertext of each of row identifiers corresponding to the multiple associated index points and restore a corresponding coded ciphertext to a plaintext row identifier, to obtain each corresponding candidate row from an out-of-order data table pre-obtained by disordering the federated data table, where a row identifier of each row is determined through row coding for the out-of-order data table; and a target determining unit 503, configured to compare a ciphertext of an attribute value of each of candidate rows in the first attribute column with the ciphertext of the query target, to determine a final target row from the candidate rows to obtain target data in the target row.

In some embodiments, the third party has a trusted cryptographic computing architecture, the trusted cryptographic computing architecture includes a plurality of nodes, each node is provided with the apparatus, and a service associated with the federated data table is processed between the apparatuses through secure multi-party computation.

In some further embodiments, a single apparatus stores a corresponding single component ciphertext for a single element in the federated data table, the query target is split into components by a querier, and the apparatus in each node holds a component ciphertext of a single component.

According to some possible designs, the apparatus 500 further includes an index creation unit (not shown), configured to determine each index point for the first attribute column in the following manner: extracting each attribute value ciphertext of the first attribute column from the out-of-order data table, to form a first index table with a coded ciphertext of a corresponding row identifier, where a coded ciphertext of a single row identifier is obtained by encrypting the single row identifier in a predetermined manner; performing sorting based on a size of an attribute value of the first attribute column after disordering the first index table; and determining each index point based on a sorting result and a predetermined attribute value segmentation manner.

In some embodiments, the index creation unit is further configured to update the coded ciphertext of the plaintext row identifier and recreate an index when one of the following is satisfied: a predetermined moment arrives; a third-party system is idle; or a quantity of restored plaintext row identifiers reaches a predetermined quantity threshold.

In some optional implementations, the plurality of index points corresponding to the first attribute column are level-1 index points of the first attribute column, a single level-1 index point corresponds to a plurality of level-2 index points, and the level-2 index points segment row data corresponding to the single level-1 index point into a plurality of level-2 index attribute value ranges; and the index unit 501 is further configured to: compare the ciphertext of the query target with a ciphertext of each level-1 index point of the first attribute column, to obtain multiple level-1 index points associated with the query target; and determine, based on comparison between the ciphertext of the query target and ciphertexts of level-2 index points corresponding to the multiple level-1 index points, the multiple associated index points of the query target from the level-2 index points.

According to some embodiments, the query target further includes a query value in a second attribute column, and the row identification unit 502 is further configured to: obtain a first plaintext row identifier set based on plaintext row identifiers restored from coded ciphertexts corresponding to the multiple associated index points; detect an intersection set of the first plaintext row identifier set and a second plaintext row identifier set, to obtain multiple common row identifiers, where the second plaintext row identifier set includes each plaintext row identifier determined based on each index point associated with the query target in the second attribute column, and each index point associated with the query target in the second attribute column is determined based on comparison between the ciphertext of the query target and ciphertexts of a plurality of index points corresponding to the second attribute column; and determine each row corresponding to each common row identifier in the out-of-order data table as a candidate row.

Notably, the apparatus 500 shown in FIG. 5 corresponds to the method described in FIG. 4, and corresponding descriptions in the method embodiment in FIG. 4 are also applicable to the apparatus 500. Details are not described here again.

According to some embodiments of another aspect, a computer-readable storage medium is further provided. The computer-readable storage medium stores a computer program, and when the computer program is executed in a computer, the computer is enabled to perform the method described with reference to FIG. 2, FIG. 4, etc.

According to some embodiments of still another aspect, a computing device is further provided, including a memory and a processor. The memory stores executable code, and when executing the executable code, the processor implements the method described with reference to FIG. 2, FIG. 4, etc.

A person skilled in the art should be aware that in the above-mentioned one or more examples, functions described in embodiments of this specification can be implemented by hardware, software, firmware, or any combination thereof. When the functions are implemented by software, the functions can be stored in a computer-readable medium or transmitted as one or more instructions or code on the computer-readable medium.

The above-mentioned described specific implementations further describe in detail the objectives, technical solutions, and beneficial effects of the technical concept of this specification. It should be understood that the above-mentioned descriptions are merely specific implementations of the technical concept of this specification, and are not intended to limit the protection scope of the technical concept of this specification. Any modification, equivalent replacement, or improvement made based on the technical solutions in the embodiments of this specification shall be included in the protection scope of the technical concept of this specification.

The invention claimed is:

1. A computer-implemented method for federated data query by a third party device to securely query target data from a federated data table of a plurality of data parties, wherein the federated data table is an attribute ciphertext data table created based on federated attribute data of the plurality of data parties for multiple service subjects, and the method is performed by the third party device and comprises:

obtaining multiple associated index points of a query target based on comparison between a ciphertext of the query target and ciphertexts of a plurality of index points corresponding to a first attribute column, wherein each index point corresponding to the first attribute column is a data segmentation point for indexes created based on attribute value sorting of the first attribute column, and the query target comprises a query value in the first attribute column;

obtaining a coded ciphertext of each of row identifiers corresponding to the multiple associated index points, wherein a row identifier of each row is determined through row coding for an out-of-order data table pre-obtained by disordering the federated data table;

restoring a corresponding coded ciphertext to a plaintext row identifier, to determine a candidate row from the out-of-order data table; and comparing a ciphertext of an attribute value of each of candidate rows in the first attribute column with the ciphertext of the query target, to determine a target row from the candidate rows to obtain target data in the target row.

2. The computer-implemented method according to claim 1, wherein the third party device has a trusted cryptographic computing architecture, the trusted cryptographic computing architecture comprises a plurality of nodes, and a service associated with the federated data table is processed between the plurality of nodes through secure multi-party computation.

3. The computer-implemented method according to claim 2, wherein the federated data table is stored in a form of component ciphertext in the third party device, a single node stores a corresponding single component ciphertext for a single element in the federated data table, the query target is split into components by a querier, and each node holds a component ciphertext of a single component.

4. The computer-implemented method according to claim 2, wherein a single node in the third party device is implemented in a trusted execution environment.

5. The computer-implemented method according to claim 1, wherein the obtaining multiple associated index points of a query target based on comparison between a ciphertext of the query target and ciphertexts of a plurality of index points corresponding to a first attribute column comprises:

performing size comparison between a ciphertext of the query value and the index points corresponding to the first attribute column; and in response to a comparison result that the query value has opposite size relationships with two adjacent index points, determining the two adjacent index points as associated index points of the query target.

6. The computer-implemented method according to claim 1, wherein the obtaining multiple associated index points of a query target based on comparison between a ciphertext of the query target and ciphertexts of a plurality of index points corresponding to a first attribute column comprises:

performing size comparison between a ciphertext of the query value and the index points corresponding to the first attribute column; and in response to a comparison result that the query value is less than all index points, determining a smallest index point as an associated index point of the query target, or in response to a comparison result that the query value is greater than all index points, determining a largest index point as an associated index point of the query target.

7. The computer-implemented method according to claim 1, wherein for the first attribute column, each index point is determined by:

extracting each attribute value ciphertext of the first attribute column from the out-of-order data table, to form a first index table with a coded ciphertext of a corresponding row identifier, wherein a coded ciphertext of a single row identifier is obtained by encrypting the single row identifier in a predetermined manner;

performing sorting based on a size of an attribute value of the first attribute column after disordering the first index table; and determining each index point based on a sorting result and a predetermined attribute value segmentation condition.

8. The computer-implemented method according to claim 1, wherein the plurality of index points corresponding to the first attribute column are level-1 index points of the first attribute column, a single level-1 index point corresponds to a plurality of level-2 index points, and the plurality of level-2 index points segment row data corresponding to the single level-1 index point into a plurality of level-2 attribute value ranges; and the obtaining multiple associated index points of a query target based on comparison between a ciphertext of the query target and ciphertexts of index points corresponding to a first attribute column comprises:

comparing the ciphertext of the query target with a ciphertext of each level-1 index point of the first attribute column, to obtain multiple level-1 index points associated with the query target; and determining, based on comparison between the ciphertext of the query target and ciphertexts of level-2 index points corresponding to the multiple level-1 index points, the multiple associated index points of the query target from the level-2 index points.

9. The computer-implemented method according to claim 1, wherein the query target further comprises a query value in a second attribute column, and the restoring a corresponding coded ciphertext to a plaintext row identifier, to obtain each corresponding candidate row from the out-of-order data table further comprises:

obtaining a first plaintext row identifier set based on plaintext row identifiers restored from coded ciphertexts corresponding to the multiple associated index points;

detecting an intersection set of the first plaintext row identifier set and a second plaintext row identifier set, to obtain multiple common row identifiers, wherein the second plaintext row identifier set comprises each plaintext row identifier determined based on each index point associated with the query target in the second attribute column, and each index point associated with the query target in the second attribute column is determined based on comparison between the ciphertext of the query target and ciphertexts of a plurality of index points corresponding to the second attribute column; and determining each row corresponding to each common row identifier in the out-of-order data table as a candidate row.

10. The computer-implemented method according to claim 1, wherein the coded ciphertext of the plaintext row identifier is updated and used to recreate an index when one of the following is satisfied:

a predetermined moment arrives;

a third-party system is idle; or a quantity of restored plaintext row identifiers reaches a predetermined quantity threshold.

11. A non-transitory, computer-readable medium storing one or more instructions executable by a computer system to perform operations for federated data query by a third party device to securely query target data from a federated data table of a plurality of data parties, wherein the federated data table is an attribute ciphertext data table created based on federated attribute data of the plurality of data parties for multiple service subjects, and the operations are performed by the third party device and comprises:

obtaining multiple associated index points of a query target based on comparison between a ciphertext of the query target and ciphertexts of a plurality of index points corresponding to a first attribute column, wherein each index point corresponding to the first attribute column is a data segmentation point for indexes created based on attribute value sorting of the first attribute column, and the query target comprises a query value in the first attribute column;

obtaining a coded ciphertext of each of row identifiers corresponding to the multiple associated index points, wherein a row identifier of each row is determined through row coding for an out-of-order data table pre-obtained by disordering the federated data table;

restoring a corresponding coded ciphertext to a plaintext row identifier, to determine a candidate row from the out-of-order data table; and comparing a ciphertext of an attribute value of each of candidate rows in the first attribute column with the ciphertext of the query target, to determine a target row from the candidate rows to obtain target data in the target row.

12. A computer-implemented apparatus, comprising:

one or more computers; and one or more computer memory devices interoperably coupled with the one or more computers and having tangible, non-transitory, machine-readable media storing one or more instructions that, when executed by the one or more computers, perform one or more operations for federated data query by the computer-implemented apparatus to securely query target data from a federated data table of a plurality of data parties, wherein the federated data table is an attribute ciphertext data table created based on federated attribute data of the plurality of data parties for multiple service subjects, and the one or more operations comprise:

obtaining multiple associated index points of a query target based on comparison between a ciphertext of the query target and ciphertexts of a plurality of index points corresponding to a first attribute column, wherein each index point corresponding to the first attribute column is a data segmentation point for indexes created based on attribute value sorting of the first attribute column, and the query target comprises a query value in the first attribute column;

obtaining a coded ciphertext of each of row identifiers corresponding to the multiple associated index points, wherein a row identifier of each row is determined through row coding for an out-of-order data table pre-obtained by disordering the federated data table;

restoring a corresponding coded ciphertext to a plaintext row identifier, to determine a candidate row from the out-of-order data table; and comparing a ciphertext of an attribute value of each of candidate rows in the first attribute column with the ciphertext of the query target, to determine a target row from the candidate rows to obtain target data in the target row.

13. The computer-implemented apparatus according to claim 12, wherein the computer-implemented apparatus has a trusted cryptographic computing architecture, the trusted cryptographic computing architecture comprises a plurality of nodes, and a service associated with the federated data table is processed between the plurality of nodes through secure multi-party computation.

14. The computer-implemented apparatus according to claim 13, wherein the federated data table is stored in a form of component ciphertext in the computer-implemented apparatus, a single node stores a corresponding single component ciphertext for a single element in the federated data table, the query target is split into components by a querier, and each node holds a component ciphertext of a single component.

15. The computer-implemented apparatus according to claim 13, wherein a single node in the computer-implemented apparatus is implemented in a trusted execution environment.

16. The computer-implemented apparatus according to claim 12, wherein the obtaining multiple associated index points of a query target based on comparison between a ciphertext of the query target and ciphertexts of a plurality of index points corresponding to a first attribute column comprises:

performing size comparison between a ciphertext of the query value and the index points corresponding to the first attribute column; and in response to a comparison result that the query value has opposite size relationships with two adjacent index points, determining the two adjacent index points as associated index points of the query target.

17. The computer-implemented apparatus according to claim 12, wherein the obtaining multiple associated index points of a query target based on comparison between a ciphertext of the query target and ciphertexts of a plurality of index points corresponding to a first attribute column comprises:

performing size comparison between a ciphertext of the query value and the index points corresponding to the first attribute column; and in response to a comparison result that the query value is less than all index points, determining a smallest index point as an associated index point of the query target, or in response to a comparison result that the query value is greater than all index points, determining a largest index point as an associated index point of the query target.

18. The computer-implemented apparatus according to claim 12, wherein for the first attribute column, each index point is determined by:

extracting each attribute value ciphertext of the first attribute column from the out-of-order data table, to form a first index table with a coded ciphertext of a corresponding row identifier, wherein a coded cipher-text of a single row identifier is obtained by encrypting the single row identifier in a predetermined manner;

performing sorting based on a size of an attribute value of the first attribute column after disordering the first index table; and determining each index point based on a sorting result and a predetermined attribute value segmentation condi-tion.

19. The computer-implemented apparatus according to claim 12, wherein the plurality of index points correspond-ing to the first attribute column are level-1 index points of the first attribute column, a single level-1 index point corresponds to a plurality of level-2 index points, and the plurality of level-2 index points segment row data corre-sponding to the single level-1 index point into a plurality of level-2 index attribute value ranges; and the obtaining multiple associated index points of a query target based on comparison between a ciphertext of the query target and ciphertexts of index points corresponding to a first attribute column comprises:

comparing the ciphertext of the query target with a ciphertext of each level-1 index point of the first attribute column, to obtain multiple level-1 index points associated with the query target; and determining, based on comparison between the ciphertext of the query target and ciphertexts of level-2 index points corresponding to the multiple level-1 index points, the multiple associated index points of the query target from the level-2 index points.

20. The computer-implemented apparatus according to claim 12, wherein the query target further comprises a query value in a second attribute column, and the restoring a corresponding coded ciphertext to a plaintext row identifier, to obtain each corresponding candidate row from the out-of-order data table further comprises:

obtaining a first plaintext row identifier set based on plaintext row identifiers restored from coded cipher-texts corresponding to the multiple associated index points;

detecting an intersection set of the first plaintext row identifier set and a second plaintext row identifier set, to obtain multiple common row identifiers, wherein the second plaintext row identifier set comprises each plaintext row identifier determined based on each index point associated with the query target in the second attribute column, and each index point associated with the query target in the second attribute column is determined based on comparison between the cipher-text of the query target and ciphertexts of a plurality of index points corresponding to the second attribute column; and determining each row corresponding to each common row identifier in the out-of-order data table as a candidate row.

\* \* \* \* \*